United States Patent [19]
Christianson

[11] Patent Number: 4,906,084
[45] Date of Patent: Mar. 6, 1990

[54] MIRROR WITH PROTECTIVE BACKING
[75] Inventor: Thomas R. Christianson, Napa, Calif.
[73] Assignee: ShowerTek, Inc., Napa, Calif.
[21] Appl. No.: 345,981
[22] Filed: May 2, 1989
[51] Int. Cl.$^4$ .............................................. G02B 5/08
[52] U.S. Cl. .................................. 350/590; 350/320; 350/589
[58] Field of Search ............... 350/320, 582, 588, 589, 350/590; 156/106; 427/162, 163

[56] References Cited
U.S. PATENT DOCUMENTS

| | | | |
|---|---|---|---|
| 2,091,714 | 8/1937 | Matthews | 350/590 |
| 4,482,209 | 11/1984 | Grewal et al. | 350/642 |
| 4,645,714 | 2/1987 | Roche et al. | 428/458 |
| 4,828,345 | 5/1989 | Kitamura et al. | 350/582 |

Primary Examiner—Bruce Y. Arnold
Assistant Examiner—J. P. Ryan
Attorney, Agent, or Firm—David Pressman

[57] ABSTRACT

A mirror for use in harsh environments, such as an anti-condensation shower mirror where hot water is sprayed onto the back of the mirror, comprises a transparent sheet (10), preferably of acrylic, a reflective film (12) on one side of the sheet, a protective layer (14) of paint on one side of the reflective layer, and a protective backing layer (16) of plastic, preferably made of PVC, on one side of the protective layer. The protective plastic backing layer protects the fragile paint and reflective films against the effects of hot water, which would otherwise cause these layers to deteriorate and flake off, thus running the mirror over time. Also an edge gasket of rubber (18) may be provided around the edges of the mirror to protect the edges of the layers.

14 Claims, 2 Drawing Sheets

MIRROR WITH PROTECTIVE BACKING

BACKGROUND--FIELD OF INVENTION

This invention relates generally to mirrors, specifically to mirrors which are used in harsh environments.

CROSS-REFERENCE TO RELATED APPLICATIONS

This invention is an improvement of the shower mirror described and claimed in my copending application, Ser. No. 07/128,995, Filed 1987 Dec 4, now U.S. Pat. No. 4,836,668, granted 1989 June 6, together with its divisional application, Ser. No. 07/311,744, Filed 1989 Feb 17. I hereby incorporate the disclosures of these cases by reference herein.

BACKGROUND--DESCRIPTION OF PRIOR ART

Heretofore inventors have proposed several types of mirrors for use in showers. These mirrors, described in my above copending cases and in the references cited therein, all use hot water from the shower head to heat the mirror so that water vapor in the shower will not condense on the front surface of the mirror and render it useless. The deficiencies of the mirrors of the references cited in my above patent are noted in my above patent.

I have discovered another deficiency of the above prior-art mirrors. This is a tendency for the reflective coating which forms the back of the mirror to deteriorate over time due to the effect of directing hot water onto this coating.

Specifically, the above prior-art shower mirrors are made of a transparent sheet of glass or acrylic plastic. The rear surface of the sheet is coated with a reflective film of silver of aluminum which provides the mirror with its reflective property.

However this reflective film is very thin and hence fragile. Thus it can easily be damaged it it is scraped or struck with almost any object. To provide some degree of protection for this film, most mirror manufacturers coat the mirror's back surface, i.e., the exposed surface of the reflective film, with a film or layer of paint, shellac, lacquer, or some other protective chemical. This protective layer is adequate for most uses of the mirrors, i.e., it provides adequate protection for the reflective film against most mechanical traumas, such as accidential scrapings or strikings.

I have found, however, that all heretofore-known, prior-art protective layers will not protect the reflective film from deterioration over time when hot water is purposely sprayed, directed, or put in constant contact with the back surface of the mirror, as is done in the above-referenced shower mirrors in order to heat them to prevent the condensation of water vapor thereon. The hot water gradually causes the protective layer of paint to flake or peel off, leaving the reflective film exposed. The hot water then causes the reflective film to flake off, leaving the front surface of the mirror with black spots or areas thereon. Gradually these black spots enlarge, rendering the mirror useless.

In addition, I have found that the edges of mirrors used in a shower are also vulnerable since they are exposed to the hot water which can work its way under the layers or films, causing them to separate or deteriorate from the edges.

OBJECTS AND ADVANTAGES

Accordingly, several objects and advantages of the invention are to provide a mirror whose reflective film is protected, at the surface and at the edges thereof, against the effects of hot water. Other objects and advantages are to provide such a mirror with protection which is easy and economical to apply and which does not require any messy or dangerous chamials. Further objects and advantages are to provide a novel and improved shower mirror and to provide a shower mirror with greater longevity and durability.

Further objects and advantages will become apparent from a consideration of the ensuing description and the accompanying drawings.

DRAWING FIGURES

Figure 1A:
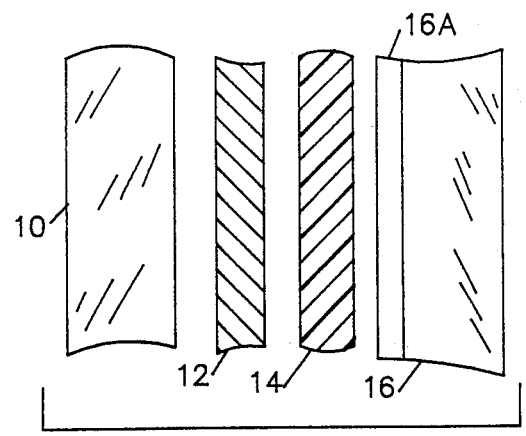
FIG. 1A is an exploded side view of a part of shower mirror with a novel protective layer according to the invention.

Drawing Reference Numerals 10 transparent sheet; 12 reflective film; 14 protective layer; 16 backing layer; 16A adhesive film; 16B peel-off layner; 18 gasket; 18A bead; 18B side edge; 18C front portion.

DESCRIPTION--FIGS. 1A TO 1C

According to a basic embodiment of the the invention, I provide a protective layer of a plastic film behind a mirror which is to be used in harsh environments, such as a shower mirror where hot water is directed against the back surface of the mirror. The plastic film protects the mirror's reflective layer from the effects of the hot water and the mirror thereby lasts much longer or indefinitely.

Figure 1B:
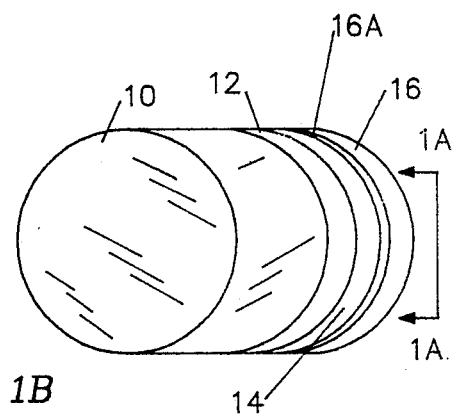
FIG. 1B is a perspective view of such shower mirror with certain layers thereof enlarged.

FIG. 1A shows an exploded partial side view of part of a mirror according to the invention, while FIG. 1B shows a perspective view of the whole mirror. The view of FIG. 1A is taken where indicated by lines 1A—1A of FIG. 1B. This mirror can be used in the embodiments of FIGS. 10 to 20A of my above cases; further details of such mirror are described in such cases.

The mirror's base comprises a circular transparent sheet, layer, or substrate 10, preferably of acrylic plastic, but glass can also be used.

A refelctive layer or film 12, preferably of aluminum (silver can also be used) is deposited on the rear surface of transparent sheet 10 in any conventional manner, such as by vacuum evaporation or sputtering. Film 12 self adheres to the rear of sheet 10.

An optional protective layer or film 14 of paint (shellac, lacquer, or any other protective chemical layer can also be used) is also conventionally coated on the rear of reflective film 12, e.g., by spraying, brushing, rolling, etc. Layer 14 self adheres to the back of film 12.

The thus-far described assembly of layers 10, 12, and 14 is conventional and has been used in shower mirrors in the past. However when hot water is sprayed or directed against the rear surface of the mirror, i.e., against paint layer 14 (see FIG. 16 of my above-referenced cases), such water will, over time, cause layer 14 to peel, whereupon the hot water will have the same deleterious effects on film 12, causing the mirror to lose its reflective properties.

According to the invention, I provide a protective backing 16 on the rear or back of protective layer 14, or directly on the back of reflective film 12 if protective layer 14 is omitted. Backing layer 16 is a made of plastic, preferably polyethylene which is about 76 microns (3 mils) thick. Alternatively other plastics, such as PVC (polyvinlychloride), MYLAR film (MYLAR is a trademark of E. I DuPont de Nemours & Co., Wilmington, Del., for polyethylene terephyalate film), nylon, acrylic, etc., can be used. Backing layer 16 is adhered to the back of protective layer 14 (or reflective film 12 if layer 14 is omitted) with a film 16A of conventional adhesive, preferably one having a tack of about 227 gm (8 oz).

Figure 1C:
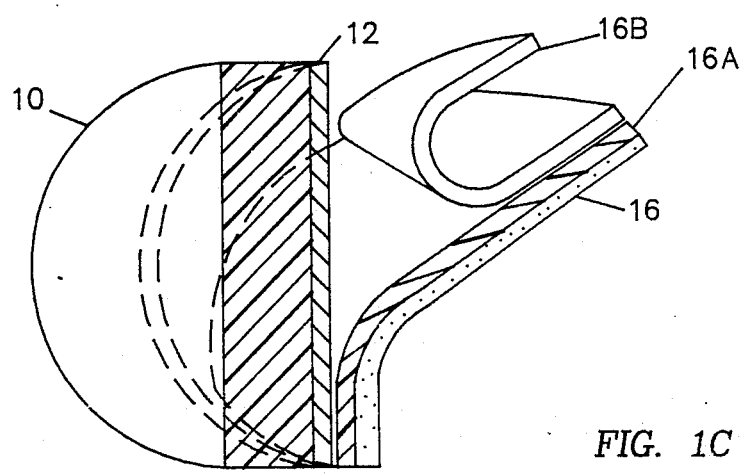
FIG. 1C is a perspective view illustrating the fabrication of such mirror.

Backing layer 16 is commercially sold in large sheets with adhesive film 16A already coated thereon; film 16A is protected prior to use by an overlying layer of conventional release paper 16B as shown in FIG. 1C, which illustrates the assembly of backing layer 16 and the peeling off of layer 16B schematically. Layer 16 is applied by peeling off the release paper and then placing layer 16 (with adhesive 16A exposed by removal of the release paper) against the back of protective layer 14 on the mirror. Then the user brays (smooths out) layer 16, e.g., with a brayer. Preferably a large transparent sheet 10 is first provided, layers 12, 14, and 16 are formed and adhered thereover, and then the sheet is cut into individual circular mirrors, as shown in FIG. 1B.

OPERATION--FIGS. 1A & 1B

After the mirror is so formed, it can be mounted in its frame (as shown in the above-referenced copending cases) and installed in a shower. I have found that when the mirror is used, i.e., when hot water is sprayed or directed against the rear of the mirror, it will last much longer or indefinitely since backing layer 16 protects the underlying layers. In addition, backing layer 16 provides additional mechanical protection against traumas beyond that provided by protective layer 14.

DESCRIPTION--FIG. 2

Figure 2:
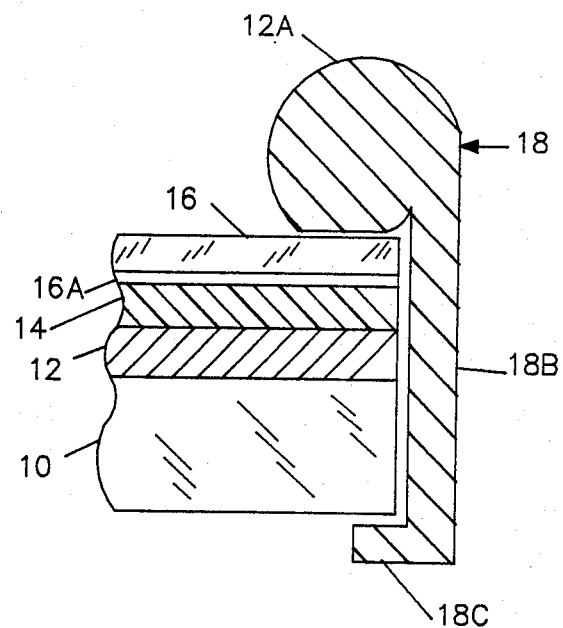
FIG. 2 is a scetional view of the mirror of FIGS. 1A and 1B with a novel gasket according to the invention.

The embodiment of FIG. 2 is similar to that of FIGS. 1A and 1C, except that it additionally has a protective gasket to shield the edge of the mirror.

FIG. 2 shows a cross-section of an edge portion of a mirror with a protective gasket in accordance with this embodiment. Specifically, layers 10, 12, 14, and 16 are identical to those of FIGS. 1A and 1B. Ignoring part 18 for the moment, note that while layer 16 will protect layers 14 and 12 from the effects of hot water sprayed on the rear surface of the mirror, the edge of the mirror is unprotected. Thus hot water can reach such edges and work its way between the layers, causing layers 12, 14, and/or 16 to peel away from transparent sheet 10.

To prevent this occurrence, a gasket 18 of rubber, soft vinyl, or the like is fitted around the mirror's edge. Gasket 18 comprises a circular bead portion 18A which seals the mirror to the frame as explained in my above-referenced copending cases. Bead 18A is the same as the entire gasket in my above-referenced copending cases.

In accordance with the invention, gasket 18 also extends around the circumferential edge of the mirror on its back side. Specifically, an edge covering portion 18B extends integrally down from gasket 18 to the front of the mirror. A front overlapping portion 18C extends integrally and normally from 18B over the circumferential edge portion of the front of the mirror. Thus gasket 18 will completely cover and protect the edge and the adjacent front and rear circumferential portions of the mirror. This will keep the hot water away from the edge of the mirror, specifically the edges of layers 10, 12, 14, and 16, so that it will not be able to separate or deteriorate such layers. This will prolong the life of the mirror.

Gaslet 18 has a circular overall edge when seen from a direction perpendicular to the front or rear of the mirror. It should have a inner diameter slightly smaller than the diameter of the mirror so that it can be stretched slightly and easily fitted around the mirror where it will retain itself in position by tension. Although a gap is shown between gasket 18 and the edge of the mirror for clarity of illustration, in practice there will be no gap due to the tension of the gasket which holds it against the mirror.

After the fabricator fits gasket 18 over the mirror, he or she assembles the now-gasketed mirror into the frame where it will be hidden. The reader can see this hiding feature of the frame and how the gasketed mirror can be assembled into the frame by reading my above-referenced copending cases, especially FIGS. 17A to 17C which show a mirror with a gasket which consists of only bead portion 18A.

SUMMARY, REMAIFICATIONS, AND SCOPE

Accordingly the reader will see that, according to the invention, I have provided a protective backing and gasket for a shower mirror which will protect its reflective and protective films, at the surface and at the edges thereof, against the effects of hot water. The protective layer and gasket are easy and economical to apply and do not require any messy or dangerous chemicals. The mirror is thus novel and improved since it has greater longevity and durability.

While the above description contains many specificities, these should not be construed as limitations on the scope of the invention, but as exemplifications of the presently-preferred embodiments thereof. Many other ramifications and variations are possible within the teachings of the invention. For example, as stated, paint layer 14 can be omitted. Also the mirror can be made in shapes other than circular, e.g., rectangular, oval, etc. the protective backing layer of plastic can be adhered to the reflective layer or the protective film without adhesive, e.g., by forming it in situ from a molten state. In lieu of the plastics mentioned, a rubber or silicone film can be used.

Thus the scope of the invention should be determined by the appended claims and their legal equivalents, and not by the examples given.

I claim:

1. A mirror comprising a transparent sheet, a reflective film covering one side of said sheet, and a protective backing layer covering said reflective film, said backing layer comprising a flexible layer of plastic and an adhesive layer adhering said layer of plastic to the back of said reflective film, and further including a protective film directly adhered to said reflective film, said plastic backing layer covering said protective film, said protective film being made of paint.

2. A mirror comprising a transparent sheet, a reflective film covering one side of said sheet, and a protective backing layer covering said reflective film, said backing layer comprising a flexible layer of plastic and an adhesive layer adhering said layer of plastic to the back of said reflective film, and further including a protective film directly adhered to said reflective film, said plastic backing layer covering said protective film, said backing layer of plastic being made from a material selected from the class consisting of polyvinylchloride and polyethylene terephalate.

3. A mirror comprising a transparent sheet, a reflective film covering one side of said sheet, and a protective backing layer covering said reflective film, said backing layer comprising a flexible layer of plastic and an adhesive layer adhering said layer of plastic to the back of said reflective film, and further including a protective film directly adhered to said reflective film, said plastic backing layer covering said protective film, and further including a flexible edge gasket covering the edges of said transparent sheet, said reflective film, said protective film, and said protective backing layer.

4. The mirror of claim 3 wherein said protective gasket comprises a bead protion covering a circumferential edge portion of said protective backing, a side portion covering the edges of said layers and extending integrally from said bead portion, and a front portion extending integrally from said side portion and covering a circumferential edge portion of said transparent sheet.

5. A mirror comprising a transparent sheet, a reflective film covering one side of said sheet, and a protective backing layer covering said reflective film, said backing layer comprising a flexible layer of plastic and an adhesive layer adhering said layer of plastic to the back of said reflective film, and further including a flexible edge gasket covering the edges of said transparent sheet, said reflective film, and said protective backing layer.

6. A mirror or claim 5 wherein said protective gasket comprises a bead portion covering a circumferential edge portion of said protective backing, a side portion covering the edges of said layers and extending integrally from said bead portion, and a front portion extending integrally from said side portion and covering a circumferential edge portion of said transparent sheet.

7. The mirror of claim 5 wherein said transparent sheet, said reflective film, and said protective backing layer are all circular in shape.

8. A mirror comprising a transparent sheet, a reflective film covering on one side of said sheet, a protective film covering said reflective film, and a protective backing layer covering said protective film, said protective backing layer comprising a layer of flexible plastic, said backing layer of plastic being adhesively adhered to said protective film by an adhesive layer, and further including a flexible edge gasket covering the edges of said transparent sheet, said reflective film, said protective film, and said protective backing layer.

9. The mirror of claim 8 wherein said protective gasket comprises a bead portion covering a circumferential edge portion of said protective backing, a side portion covering the edges of said layers and extending integrally from said bead portion, and a front portion extending integrally from said side portion and covering a circumferential edge portion of said transparent sheet.

10. The mirror of claim 8 wherein said transparent sheet, said reflective film, said protective film, and said protective backing layer are all circular in shape.

11. The mirror of claim 8 wherein said backing layer of plastic is polyvinylchloride and is adhesively adhered to said protective film.

12. A method of making a mirror comprising:
providing a a transparent sheet,
forming a reflective film on one side of said sheet, and adhering a protective backing layer over said relective film, said protective layer comprising a layer of plastic coated witha layer of adhesive, said adhering being performed by placing the adhesive-coated side of said layer of plastic against said reflective film and pressing said layers of plastic and reflective film together.

13. The method of claim 12, further including providing a protective film over said reflective film prior to adhering said layer of plastic thereto.

14. The method of claim 12, further including forming a flexible edge gasket over the edges of said transparent sheet, said reflective film, and said protective backing layer.

* * * * *

UNITED STATES PATENT AND TRADEMARK OFFICE
CERTIFICATE OF CORRECTION

PATENT NO. : 4,906,084

DATED : March 6, 1990

INVENTOR(S) : T. R. Christianson

It is certified that error appears in the above-identified patent and that said Letters Patent is hereby corrected as shown below:

Abstract, l. 12, change "running" to --ruining--.

Col. 2, l. 31, change "layner" to --layer--.

Col. 4, l. 11, change "Gaslet" to --Gasket--.

Col. 5, l. 39, change "A mirror or" to --The mirror of--.

Col. 6, l. 33, change "witha" to --with a--.

Signed and Sealed this

Twenty-eighth Day of April, 1992

Attest:

HARRY F. MANBECK, JR.

*Attesting Officer*     *Commissioner of Patents and Trademarks*